United States Patent
Hauck

(10) Patent No.: US 7,048,244 B2
(45) Date of Patent: May 23, 2006

(54) SEAT TRACK ASSEMBLY AND METHOD OF MANUFACTURE

(75) Inventor: Brent Hauck, Hunstville (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 4 days.

(21) Appl. No.: 10/761,812

(22) Filed: Jan. 20, 2004

(65) Prior Publication Data

US 2004/0200945 A1    Oct. 14, 2004

Related U.S. Application Data

(60) Provisional application No. 60/443,674, filed on Jan. 29, 2003.

(51) Int. Cl.
*F16M 13/00* (2006.01)

(52) U.S. Cl. .................................. 248/430; 297/388.11

(58) Field of Classification Search ................ 248/424, 248/429, 430; 297/344.1, 344.2, 344.17
See application file for complete search history.

(56) References Cited

U.S. PATENT DOCUMENTS

| | | | |
|---|---|---|---|
| 4,802,374 A | | 2/1989 | Hamelin et al. |
| 5,048,886 A | * | 9/1991 | Ito et al. .................. 296/65.14 |
| 5,259,257 A | * | 11/1993 | Mouri ........................ 248/429 |
| 5,273,242 A | * | 12/1993 | Mouri et al. ................ 248/429 |
| 5,314,158 A | * | 5/1994 | Mouri ........................ 248/429 |
| 5,348,262 A | * | 9/1994 | Isomura ...................... 248/430 |
| 6,138,974 A | * | 10/2000 | Okada et al. ............... 248/429 |
| 6,220,642 B1 | * | 4/2001 | Ito et al. .................. 296/65.14 |
| 6,244,660 B1 | * | 6/2001 | Yoshimatsu .............. 297/344.1 |
| 6,260,922 B1 | * | 7/2001 | Frohnhaus et al. ......... 297/330 |
| 6,557,809 B1 | | 5/2003 | Downey |
| 6,575,421 B1 | * | 6/2003 | Houston et al. ............ 248/429 |
| 6,915,998 B1 | | 7/2005 | Borbe et al. |
| 2005/0082890 A1 | | 4/2005 | Werner et al. |

FOREIGN PATENT DOCUMENTS

| | | | |
|---|---|---|---|
| DE | 1755740 | * | 1/1972 |
| DE | 19815283 C2 | * | 10/1999 |
| DE | 10003305 C1 | * | 6/2001 |
| DE | 10139631 | * | 3/2005 |
| JP | 2003320873 A | * | 11/2003 |

* cited by examiner

*Primary Examiner*—Ramon O Ramirez
(74) *Attorney, Agent, or Firm*—John R. Benefiel; Dean B. Watson

(57) ABSTRACT

A seat track assembly for an automotive seat positioner mechanism includes a threaded spindle fixed at one end to a lower track and a mating nut in a gear case on the spindle mounted to an upper track by a bracket attached thereto. The bracket is stabilized against crash forces by interfit portions on the bracket and side walls of the upper track. The spindle is directly attached to the lower track by fasteners passed through a flattened end of the spindle and a bottom wall of the lower track.

16 Claims, 4 Drawing Sheets

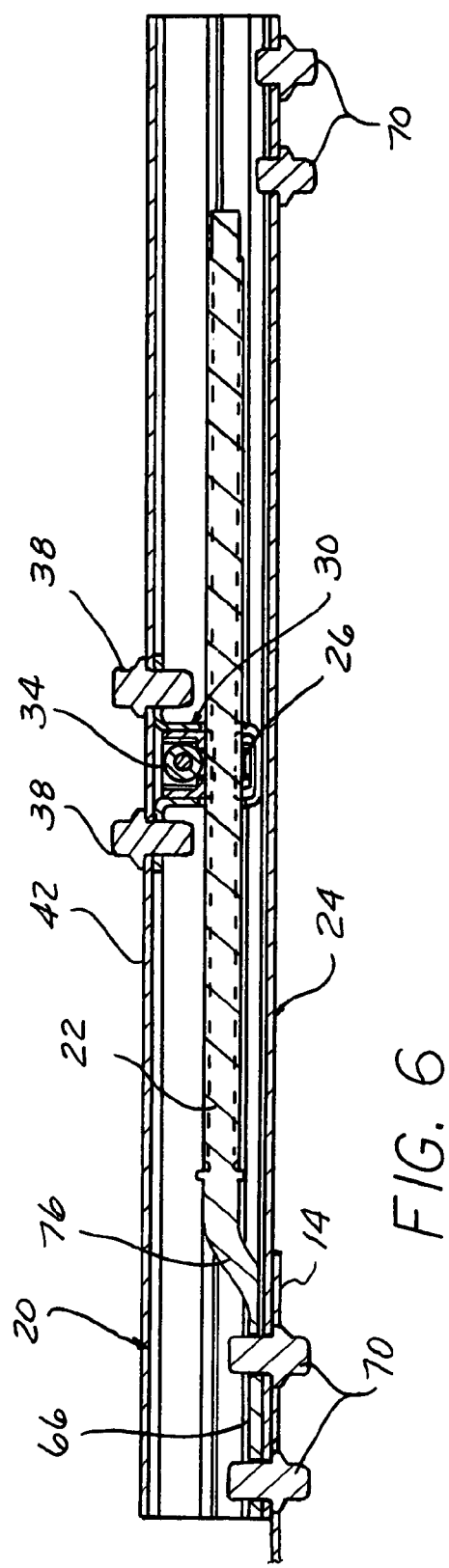
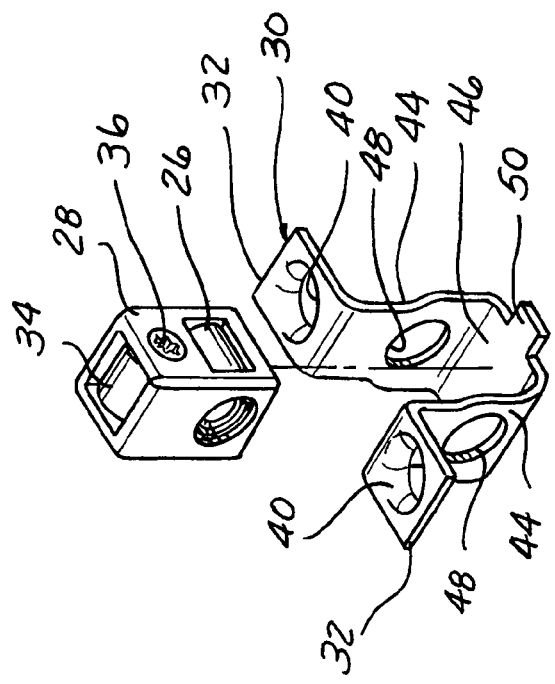

SEAT TRACK ASSEMBLY AND METHOD OF MANUFACTURE

CROSS REFERENCE TO RELATED APPLICATIONS

This invention claims the benefit of U.S. provisional Ser. No. 60/443,674, filed Jan. 29, 2003.

FIELD OF THE INVENTION

The present invention relates to seat track assemblies used in positioner mechanisms for automobile seats.

BACKGROUND OF THE INVENTION

Automotive powered seat positioning mechanisms are known of the type using a threaded spindle engaged by a gear nut carried by an upper track, with the gear nut driven by a worm gearing in turn driven by a motor. Rotation of the gear nut causes the gear nut and an enclosing gear case to drive the upper track so as to be advanced in either direction along the spindle. Such mechanisms are described in U.S. Pat. No. 4,802,374 and WO 9951456.

The gear nut and worm gear are typically carried in a gear casing mounted on a U-shaped bracket having its legs attached to the upper track to cause the movement of the gear nut to drive the upper track in either direction. The spindle is mounted spaced above the bottom wall of a lower track on a pair of brackets each located at an opposite end of the spindle, these brackets in turn attached to the lower track.

The automobile seat is held in any adjusted position by the gear nut and spindle and these components are thus subjected to high loads in the event of a crash or other high stress event and the support for these components must therefore be designed to have adequate strength to resist the stresses imposed.

It is desirable that the seat adjustment mechanism be fully functional after a crash.

The bracket supporting the gear nut and gear casing tends to be distorted as the upper track supporting the seat and the occupant tends to move forward in a crash or other high stress event, and this is resisted by the gear nut-spindle engagement, applying of forces offset from the point of attachment to the upper track. The unattached lower ends of the legs of the bracket cannot effectively resist these forces. The bottom location of the leg connecting portion of the bracket prevents any fastener attachment to the side walls of the upper track after assembly since that portion is then completely inaccessible. Thus, heavy gauge steel must be employed to construct the bracket to resist the forces applied in this manner.

The spindle itself must be well anchored to resist these stresses, which typically is done by a heavy gauge bracket mounted at each end of the spindle. These sturdy brackets must in turn be securely attached to the lower track.

It is the object of the present invention to provide a track assembly in which the connection between the bracket and the upper track provides a balanced loading of the bracket which efficiently resists the forces imposed thereon in a crash or other high stress event.

It is another object to simplify the attachment of the spindle to the lower track while still providing ample strength to withstand the crash induced stresses imposed thereon.

SUMMARY OF THE INVENTION

The above object and others which will become apparent upon a reading of the following specification and claims are achieved by a track assembly including nested upper and lower channel shaped tracks. The upper track and gear case bracket also have portions which are configured to be interfit together when the upper track is placed over the bracket which creates a connection therebetween resisting relative displacement therebetween in the lengthwise direction of the track. The upper track has side walls and a top wall to which an upper end of the bracket is fixed after the upper track is installed onto the bracket. The interfit portions of the bracket may comprise a pair of protrusions projecting side ways in opposite directions from a respective side of bracket leg connecting portion located at the bottom of the bracket. These protrusions may comprise tabs or teeth which are received in a complementarily shaped notch in a bottom edge of each upper track sidewall, when the upper track is placed over the bracket during assembly.

This design secures both the top and bottom portions of the bracket relative to the upper track so as to efficiently resist the tendency of the bracket to be deformed under the stresses developed in a crash event.

The spindle itself is anchored at one end by being flattened at one end with an offset locating the flattened end against the lower track bottom wall so that the spindle is spaced above the bottom track bottom wall. The flattened end is directly attached to the lower track bottom wall with fasteners which can also attach the lower track to the floor pan or a separate mounting bracket.

This creates a high strength anchoring of the spindle while eliminating the two supporting brackets typically employed to mount the spindle. This lowers the manufacturing costs and precludes any possibility of such support brackets breaking loose in a crash.

DESCRIPTION OF THE DRAWINGS

FIG. 6 is a longitudinal section taken through the track assembly shown in FIG. 2.

FIG. 7 is an exploded pictorial view of the gear casing and mounting bracket.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
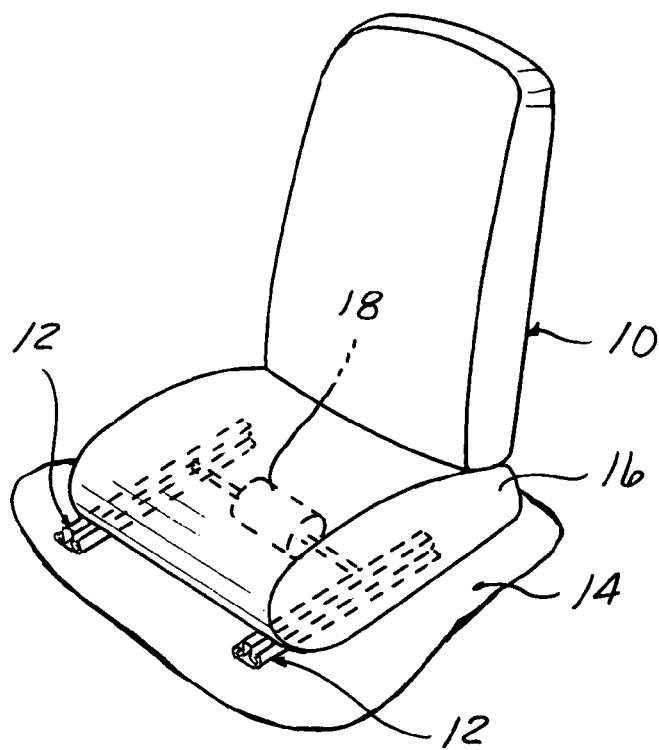
FIG. 1 is a pictorial view of an automotive seat supported and positioned by a pair of parallel track assemblies according to the invention and a drive system therefore.
Figure 2:
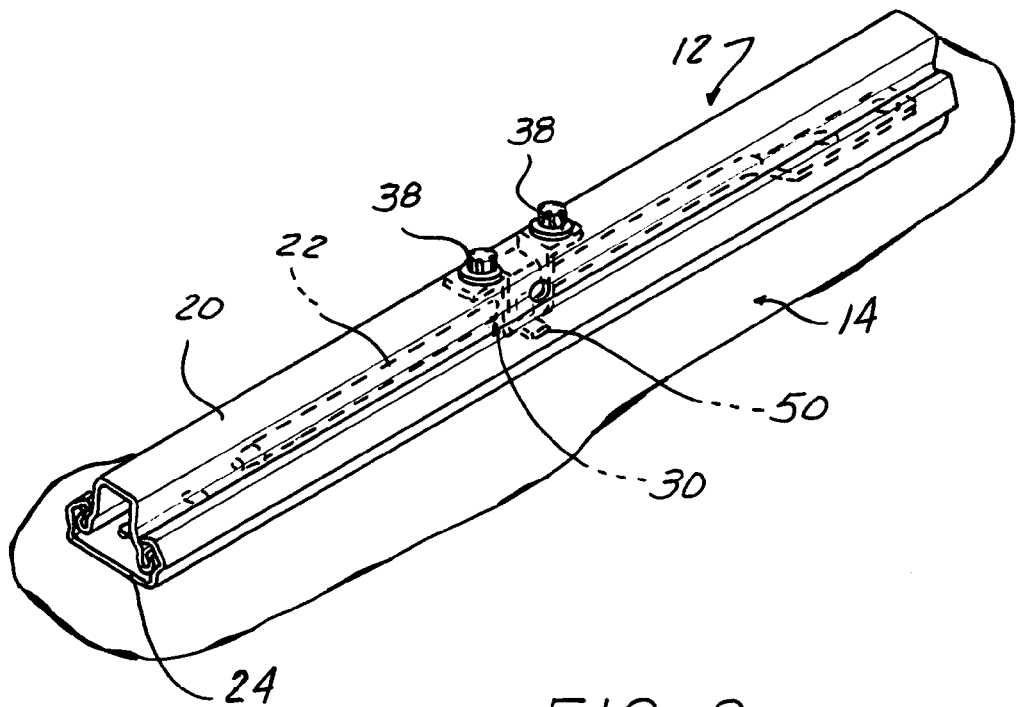
FIG. 2 is a pictorial view of one of the track assemblies shown in FIG. 1.

Referring to the drawings, FIG. 1 illustrates the mounting of an automotive seat 10 on a pair of parallel track assemblies 12 secured to the vehicle floor pan 14 and to the seat bottom 16 in conventional fashion. A separate mounting bracket (not shown) may also be used rather than a direct attachment to the floor pan. A rotary drive system 18 is employed to simultaneously drive an upper track 20 of each track assembly 12 to move the seat forward or backwards in the well known manner on a lower track 24 comprised of an upward facing channel within which the upper track 20 is nested.

This general arrangement is described in U.S. Pat. No. 4,802,374 and WO 9951456.

Figure 3:
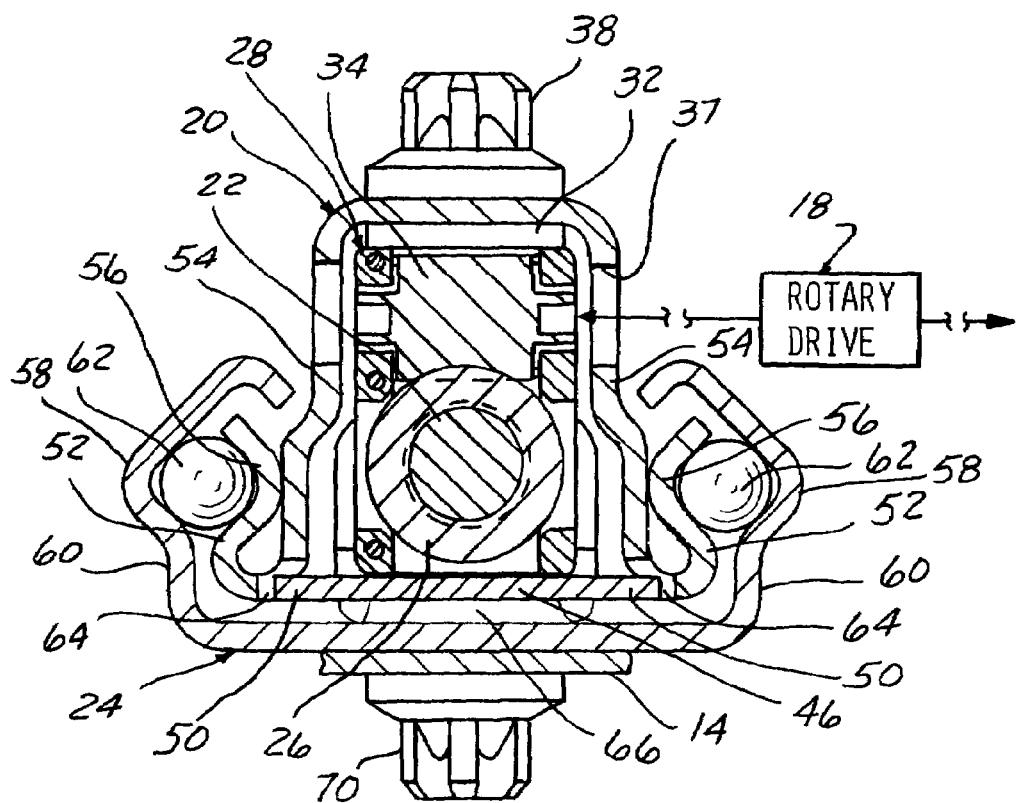
FIG. 3 is a view of a transverse section taken through the track assembly shown in FIG. 2.

In this arrangement, each of the upper tracks 20 are driven by rotation of an associated threaded horizontal spindle 22 mounted to the lower track 24 of each track assembly 12 extending in a lengthwise direction, and a gear nut 26 is threaded onto the spindle 22 (FIG. 3). The gear nut 26 is rotatable within a gear casing 28 (FIG. 7) and has a lengthwise driving engagement with the upper track 20 by being captured between the straddling legs 44 of a U-shaped bracket 30 attached to the upper track 20. The gear case 28 may be made of two die cast parts assembled together using integral alignment posts as indicated on one part received in mating holes in the other part as per a common manufacturing practice.

A worm gear 34 is also rotatably held in the gear casing 28 rotated by the drive system 18 by a cable or shaft (not shown) mating with a square drive socket in the ends of the worm gear. The cable or shaft can pass through an opening 36 (FIG. 7) in the side of the gear casing 28 from the side of each upper track 20. An aligned hole 37 is also provided in each side wall 54 of the upper track 20 for this same purpose.

Each bracket 30 has a pair of mounting flanges 32 each located at the top of a respective leg 44, and each having a hole 40 receiving a screw 38 passing through an aligned hole 39 in the upper wall 41 of the upper track 20 to be secured thereto.

The parallel legs 44 each extend down from a respective flange 32 (best seen in FIG. 7) and are connected together at their lower ends with a connecting portion 46. The legs 44 have aligned holes 48 to accommodate passage of the spindle 22.

The bracket 30 has a pair of protrusions 50 which may be comprised of tab or tooth features each projecting laterally out in an opposite direction towards a respective upper track side wall 54 from a respective side edge of the connecting portion 46 of the bracket 30 (FIGS. 3 and 6).

As noted above, the upper track 20 comprises a downwardly facing elongated channel section nested within the lower track 24 which comprises an upwardly facing elongated channel section as best seen in FIG. 3.

The upper track 20 is slidably mounted on the lower track 24 by a bearing arrangement as described in detail in U.S. Pat. No. 6,557,809 B2, assigned to the assignee of the present application.

This arrangement includes a reversely formed lip 52 extending up from a rolled bottom edge 74 of each side wall 54 of the upper track 20 (FIG. 3). An angled portion 56 of the lip 52 faces an angled portion 58 of each side wall 60 of the lower track 24 to create a roughly square bearing space into which are disposed "load transmission elements", here shown as balls 62. An interference is created so that at least one of the tracks is resiliently deflected by the balls 62, as described in detail in U.S. Pat. No. 6,557,809 B2.

The rolled bottom edge 74 of each of the upper track side walls 54 are formed with recesses here shown as notches 64, which are shaped to mate with the protrusions 50 received therein. The notches 64 extend horizontally into the rolled edges 74 at the lower end of each side wall 54. Thus, as the upper track 20 is lowered onto the lower track 24 and over the bracket 30, the tabs 50 move into the notches 64. This effectively creates an interconnection resisting lengthwise movement of bracket portion 46 relative the upper track 20 without the need for installing any fasteners nor any access to the now enclosed bracket 30.

This interconnection with the bottom edge of the upper track 20 at the lower end of the bracket 30 complements the connection of the upper end of the bracket 30 provided by the later installed fasteners 38 to create a box structure greatly strengthening the ability of the bracket 30 to withstand distorting forces imposed by the nut gear 26 and gear casing 28 in as much as the legs 44 of the bracket 30 are restrained from bending, and the load is shared with the screws 38. The bracket 30 can thus be made lighter and is less likely to fail. This connection is achieved without any additional parts or assembly labor.

The spindle 22 is mounted to the lower track 24 by flattening one end 66 of the spindle 22 (made from alloy steel bar stock).

The flattened end 66 is pierced with mounting holes 68 to receive screws 70 passing through holes 72 in the bottom wall of the lower track 24 (as well as a section of the vehicle floor pan 14 or separate mounting bracket) to secure the one end of the spindle 22 thereto.

Figure 4:
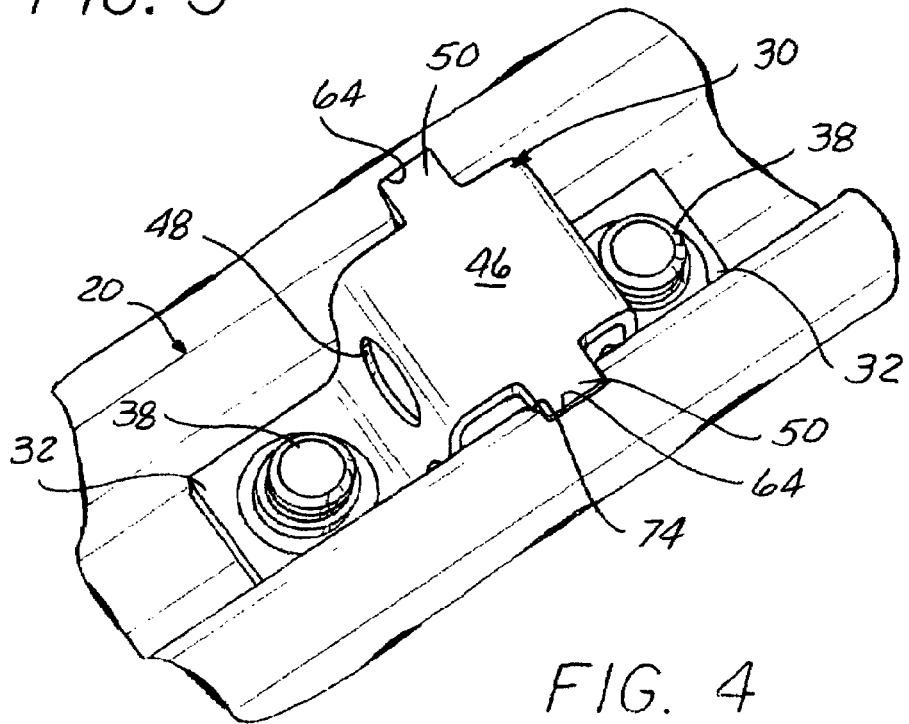
FIG. 4 is an inverted pictorial view of an installed gear casing bracket together with a fragmentary portion of the upper track to which it is mounted.
Figure 5:
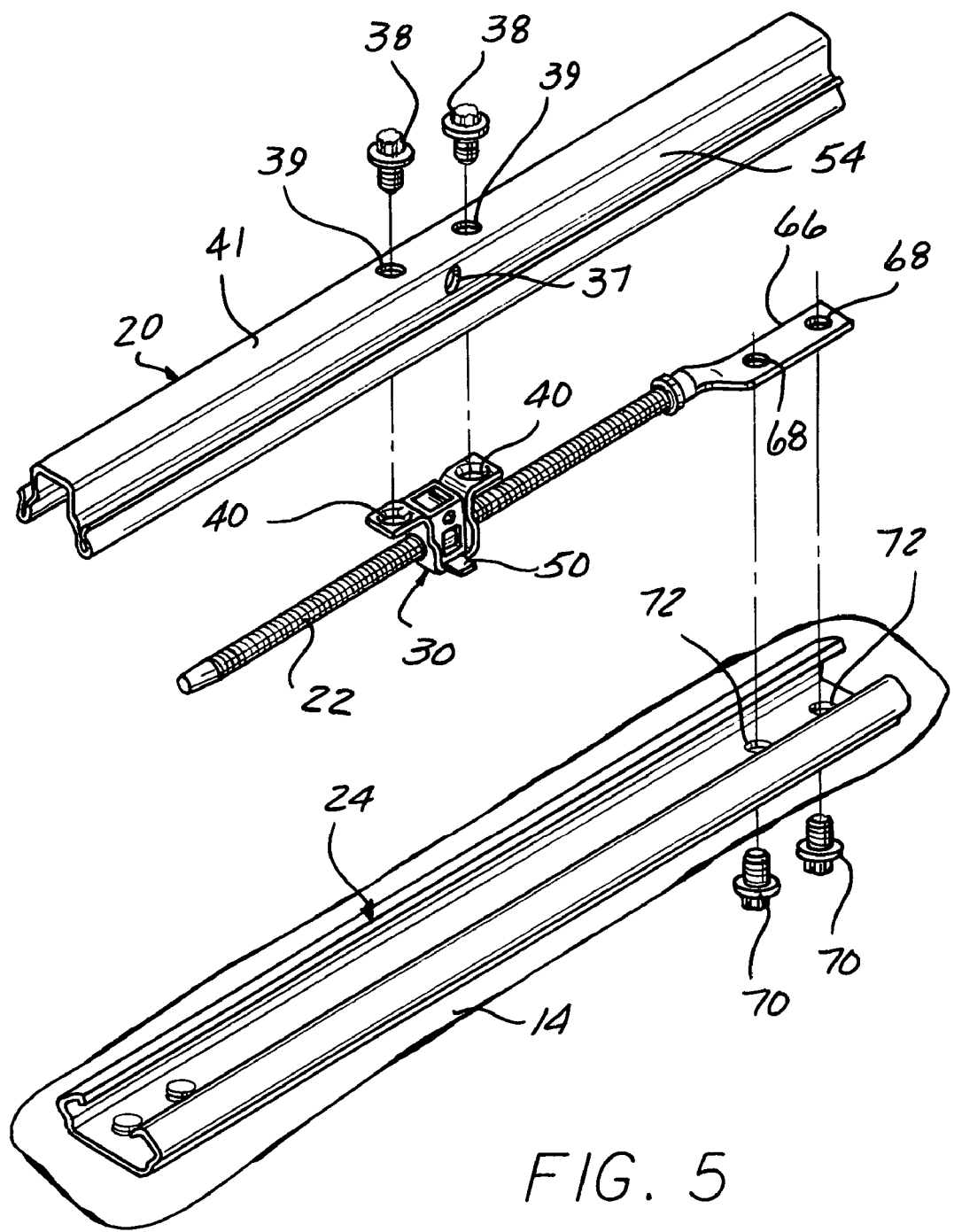
FIG. 5 is an exploded pictorial reverse view of a fragmentary part of the track assembly shown in FIG. 2.

The spindle 22 is formed with an offsetting transition 76 which positions the spindle 22 spaced above the bottom wall of the lower track 24, as best seen in FIG. 4.

This mounting completely eliminates the spindle brackets used in prior designs which reduces the cost of the track assembly and avoids any possibility of failure by separation of separate brackets in the event of a crash or other high stress event.

The track assembly is assembled by attaching the spindle to the lower track 24 using screws 70, which at the same time may be attached to the floor pan 14 (or to a separate mount). The bracket 30, gear nut 26, and gear casing 28 are preassembled to the spindle 22. The upper track 20 is placed into the lower track 24 with the holes 39 in the top wall 41 aligned with holes 40 in the bracket flanges 32. The fasteners 38 are then used to fix the bracket flanges 22 to the top wall 41.

The protrusions 50 and recesses 64 are automatically mated when the upper track 20 is installed on the lower track 24 with the holes 39 and 40 aligned.

The invention claimed is:

1. A seat track assembly comprising:
   an upper track comprised of an elongated inverted channel member having a pair of downwardly extending side walls and a top wall connecting said side walls;
   a lower track comprised of an elongated channel member having upwardly extending side walls and a bottom wall connecting said side walls, said upper track received between said side walls of said lower track;
   an elongated threaded spindle mounted to said lower track bottom wall extending along and between said side walls of said upper and lower tracks;
   a gear nut threaded on said spindle, said gear nut rotatably carried in a gear case, said gear nut and said gear case driving said upper track upon rotation of said gear nut on said spindle by a bracket capturing said gear case and affixed to said top wall of said upper track, said bracket having a pair of legs spaced apart in the lengthwise direction of said upper track and connected together by a connecting portion, said gear case disposed between said bracket legs to be captured therein; and said bracket and at least one of said side walls of said upper track having interfit portions configured to resist relative lengthwise movement therebetween, thereby enhancing the ability of said bracket to withstand forces imposed thereon by said gear nut and gear casing.

2. The assembly according to claim 1 wherein said bracket legs are each attached to said upper track top wall at an upper end thereof, and wherein said interfit portions include at least one protrusion on said bracket connecting portion located at the bottom of said bracket and a complementary recess in at least one of said side walls of said upper track receiving said protrusion to be interfit therewith.

3. The assembly according to claim 2 wherein said upper track side walls have a bottom edge and said recess is formed therein.

4. The assembly according to claim 2 wherein said at least one protrusion comprises at least one tab integral with said connecting portion of said bracket and a complementary notch at the bottom of at least one of said side walls of said upper track, said tab fit into said notch.

5. The assembly according to claim 1 wherein said interfit portions comprise a protrusion projecting laterally from each side of said bracket connecting portion and a recess in each side wall of said upper track receiving a respective protrusion.

6. The assembly according to claim 5 wherein each upper track has a rolled bottom edge and each recess extends horizontally into a respective rolled bottom edge to receive a respective protrusion as said upper track is placed over said bracket.

7. The assembly according to claim 5 wherein each of said protrusions comprises a tab projecting from a respective side of said connecting portion of said bracket, and wherein each side wall of said upper track has a notch receiving a respective tab therein.

8. The assembly according to claim 1 wherein said interfit portions are configured to be mated together when said upper track is placed over said bracket.

9. The assembly according to claim 1 wherein said spindle has an integral flattened end attached to said connecting bottom wall of said lower track by one or more fasteners passing therethrough.

10. The assembly according to claim 9 wherein said flattened end of said spindle is offset to align a longitudinal axis of said spindle spaced above said bottom wall of said lower track.

11. A method of making a seat track assembly of the type including an upper track comprised of an elongated inverted channel member having a pair of downwardly extending side walls and a top wall connecting said side walls;

a lower track comprised of an elongated channel member having upwardly extending side walls and a bottom wall connecting said side walls, said upper track received between said side walls of said lower track;

an elongated threaded spindle mounted to said lower track bottom wall extending along and between said side walls;

a gear nut threaded on said spindle, said gear nut rotatably carried in a gear case, said gear nut and gear case driving said upper track lengthwise upon rotation of said gear nut on said spindle by a bracket having a pair of legs spaced apart in the lengthwise direction of said upper track, said bracket legs connected together by a connecting portion, said gear case disposed between said bracket legs, and said bracket affixed to said top wall of said upper track, and including the steps of:

forming said upper track side walls and said bracket with respective complementary features and interfitting said features upon installation of said upper track onto said bracket so as to restrain movement of said bracket relative said upper track side walls, thereby enhancing the ability of said bracket to withstand lengthwise directed forces imposed by said gear nut and gear case.

12. The method according to claim 11 wherein said step of forming interfit portions include the step of forming at least one projecting tab on said bracket connecting portion and a complementary recess in an upper track side wall.

13. The method according to claim 11 wherein said step of forming interfit portions comprises the step of forming a tab on each side of said bracket connecting portion projecting towards a respective side wall of said upper channel; and, forming a recess in the bottom of each side wall thereof located and configured to receive and be interfit to a respective tab when said upper track is installed over said bracket.

14. A method of manufacturing a seat track assembly including the steps of:

mounting a threaded spindle to extend along and within a channel shaped lower track;

forming a channel shaped upper track with a pair of side walls having a recess extending into a bottom edge of said side walls;

installing a gear nut onto said spindle threads;

enclosing said nut in a gear case having openings allowing said spindle to pass through said gear case while confining said gear nut therein;

forming a bracket having a pair of legs which straddle said gear case to capture the same while having openings allowing said spindle to pass therethrough, with said legs connected together at one end with a connecting portion;

forming said bracket and said upper track side walls with portions interfit with each other upon placing said upper track over said bracket and gear case; and fastening said bracket to said upper track top wall by installing fasteners through said upper track top wall and said bracket.

15. The method according to claim 14 wherein said bracket is installed with said connecting portion at the bottom thereof and free ends of said legs at the top and wherein said free ends are formed with flanges which are fastened to said upper track top wall in said fastening step.

16. The method according to claim 15 wherein a pair of oppositely projecting tabs are formed in said bracket connecting portion comprising some of said interfit portions and wherein said upper track side walls are formed with corresponding notches at the bottom thereof into which said tabs are received when said upper track is installed over said bracket and gear case.

* * * * *